United States Patent [19]

Kratochvil

[11] 3,854,972

[45] Dec. 17, 1974

[54] LIGHT-WEIGHT AGGREGATES

[76] Inventor: Miroslav Kratochvil, Bondi Junction, New South Wales, Australia

[22] Filed: May 7, 1973

[21] Appl. No.: 358,042

[52] U.S. Cl. .............................. 106/288 B, 106/87
[51] Int. Cl. ................................................ C09c 1/00
[58] Field of Search .......... 106/288, 288 B, 309, 72, 106/87

[56] References Cited
UNITED STATES PATENTS

| | | | |
|---|---|---|---|
| 1,574,380 | 2/1926 | Endres | 106/309 |
| 1,856,929 | 5/1932 | Peck | 106/288 B |
| 1,934,637 | 7/1930 | Ralton | 106/309 |
| 2,081,802 | 5/1937 | Rafton | 106/87 |
| 2,987,411 | 6/1961 | Minnick | 106/288 B |
| 3,378,382 | 4/1968 | Burkett | 106/288 B |
| 3,607,339 | 9/1971 | Davies | 106/309 |
| 3,752,688 | 8/1973 | Fuchs et al. | 106/409 |

FOREIGN PATENTS OR APPLICATIONS

| | | | |
|---|---|---|---|
| 125,329 | 9/1947 | Australia | 106/87 |

*Primary Examiner*—Delbert E. Gantz
*Assistant Examiner*—Juanita M. Nelson
*Attorney, Agent, or Firm*—George F. Smyth

[57] ABSTRACT

A process for producing light-weight aggregate by treating primary material such as mud or soil wherein the primary material is dried if necessary and crushed prior to firing in a kiln, together with the step of treating the material to initiate or assist in the bloating of the aggregate. One such manner from which the primary material may be so treated comprises mixing with the primary material, prior to crushing thereof, combustible particulate material such as sawdust, shredded grass, straw or the like.

11 Claims, No Drawings

LIGHT-WEIGHT AGGREGATES

This invention relates to the production of light-weight aggregates for use in manufacture of concrete, structural clay products or other products incorporating a bond of matrix material able to set to solid condition.

This invention has particular application in dredging and reclamation activities. Conventionally, where river beds are dredged to remove mud and other pollutant materials therefrom, dredged materials are loaded on barges and carried to sea where they are dumped. This is an expensive and timeconsuming procedure. This invention contemplates, inter alia, a process whereby dredged material may be converted to lightweight aggregate in the vicinity of the dredging site, for example, by processing in a kiln established on a pontoon.

Further, conventional reclamation involves the dumping of large quantities of rock and other waste material in the reclamation area. Such material is usually transported to the reclamation area, sometimes over long distances at great expense. This invention further contemplates, inter alia, a process whereby raw material may be recovered from the reclamation site, processed into light-weight aggregate in situ and dumped as part of the reclaiming material.

It is well known in the art that aggregates may be produced from mud by drying recovered mud, if necessary, crushing the dried mud and firing the crushed mud in a kiln.

Such processes produce aggregates of varying qualities depending on the nature of the mud processed. Where mud particles are coarse, as in comparatively young muds, the aggregate produced will be heavy and brittle and of little economic value. Where the mud consists of very fine particles, some bloating will occur in the processing of the aggregate and a better quality aggregate will result. In bloating, certain organic materials contained in the mud decompose on heating and form gases. If the mud comprises particles which are sufficiently fine, certain of these gases will be retained by the matering during processing, thus expanding and reducing the weight of the final product. It is desirable to bloat aggregates to a high degree in order to produce aggregates of low density and comparatively light weight.

Thus, it is an object of this invention to produce improved light-weight aggregates from inexpensive and, in preferred instances, unwanted material.

This invention realizes that object by vitrifying primary materials such as soils and muds containing organic or mineral detritus or waste under conditions which gassify the materials to form an expanded cellular or bloated product.

This invention consists of a method of producing a light-weight aggregate comprising the steps of recovering mud or soil, drying recovered material if necessary, crushing the material, and firing the crushed material in a kiln, together with the step of treating the material to initiate or assist the bloating of the final product.

All muds and soils contain organic or mineral detritus to some extent.

After recovering mud, it is necessary to determine the coarseness of the mud prior to processing. As indicated above, fine grained muds may be processed to lightweight aggregates without the provision of aids to the bloating procedure. Coarse grained muds, if they are to be processed to light-weight aggregates, require treatment by processes which will initiate or aid the bloating process. A person skilled in the art may determine which muds are too coarse to be processed into light-weight aggregates, merely by examining a sample of the mud held in the hand. However, it is not easy to determine from a hand held sample whether a mud is sufficiently fine-grained to allow production of a light-weight aggregate from the mud without aiding the bloating process, since grain sizes in such muds are required to be not greater than the order of 5 to 7 microns. To select such muds, a small quantity of mud, say three teaspoonfuls, is added to a measuring cylinder containing approximately 50 mls. of water. Coarse mud particles will sink from suspension more quickly than fine grained particles. Where a large proportion of such particles remain suspended for three days or more, the mud is sufficiently fine to produce a suitable bloated light-weight aggregate.

A further matter which must be determined prior to processing of the mud or soil is the moisture content of the primary material. Some muds may be processed without preliminary drying to rid the mud of unwanted water content but in the majority of muds it is necessary to relieve the mud of some water content prior to firing. A mud which is merely obtained and left on a plate or mesh will dry naturally, but such drying procedure is usually too slow to be of practical utility. It is conventional to dry mud by placement of same on a hot plate. However, one step in the aggregate producing process of this invention, in a preferred form, contemplates exposing the mud in shallow containers to a temperature above the boiling point of water. This creates steam bubbles, many of which are trapped in the material as it hardens on drying. These steam bubbles thus contribute towards the bloating of the final product.

After recovered mud or soil is dried, the comparatively hard, spongy mass may be crushed to a fineness, for example, such that it will pass through a 1½ inch mesh but will substantially all be retained on a ½ inch mesh screen. Such crushed material is then fed into a kiln and fired.

An alternative drying procedure is to heat the recovered primary material and spray it through the air, whereby the material is dried and partially hardened. Again, numerous steam bubbles will be trapped in the material as it hardens and these trapped steam bubbles will contribute towards the bloating of the final product. The spreaded material on being arrested by an obstruction forms a spongy mass which after full drying and crushing may be fired.

A further modification of the invention directed towards the initiation or assistance of the bloating process envisages mixing with the primary material prior to crushing combustible particulate materials such as sawdust, shredded grass, straw or others which can be economically obtained. Mixing with the primary material one or more of such combustible materials is advantageous in that the added material burns out during firing so creating voids or cells within the mass to produce a high-quality light-weight aggregate.

A further embodiment of this invention envisages the addition of gassing agent to the primary material. Accordingly, it has been found advantageous to add aluminium powder to the primary material and to thoroughly mix this powder into the material. Towards the end of this mixing, addition of alkali to the mixture will considerably assist the bloating of the mixture. Suitable alkalis have been found to be either lime or caustic soda.

Whereas the invention has been described mainly with reference to river or harbour mud as the starting material, other suitable primary materials such as soils may be used. The use of soil could be economical for construction projects far removed from more conventional sources of aggregate.

What I claim is:

1. In a process for treating a coarse grained mud or soil having a relatively large quantity of material with a grain size larger than the order of 5 to 7 microns and containing organic or mineral detritus or waste that is gasifiable during firing of the dry crushed mud or soil in a kiln at a firing temperature sufficient to sinter the mud or soil and to cause gasification of said organic or mineral detritus or waste with bloating of the mud or soil to produce voids therein to form a light weight aggregate, the improvement comprising:
   forming voids within said mud or soil prior to or during said firing which voids are in addition to voids formed through gasification of said organic or mineral detritus or waste,
   whereby said coarse grained mud or soil is made usable in the formation of a light weight aggregate.

2. The process of claim 1 including
   drying said mud or soil which contains water in a shallow container at a temperature above the boiling point of water to form trapped steam bubbles within the dried mud or soil.

3. The process of claim 1 including
   heating said mud or soil which contains water, and
   spraying said heated material through the air against an obstruction to produce drying and partial hardening of the material and formation of trapped steam bubbles within the material.

4. The process of claim 1 including
   admixing combustible particulate material with said mud or soil prior to crushing,
   whereby said combustible material is gasified during firing to produce voids in the heat bloated material in addition to voids resulting from gasification of said organic or mineral detritus or waste during firing.

5. The process of claim 1 including
   admixing aluminum powder with said mud or soil, and
   adding an alkali to the admixture to form gas bubbles therein,
   whereby said bubbles promote the formation of voids within said mud or soil which are in addition to voids produced by gasification of said organic or mineral detritus during firing.

6. The process of claim 2 including
   admixing combustible particulate material with said mud or soil prior to crushing,
   whereby said combustible material is gasified during firing to produce voids in the heat bloated material in addition to the voids produced by gasification of said organic or mineral detritus or waste.

7. The process of claim 3 including
   admixing combustible particulate material with said mud or soil prior to crushing,
   whereby said combustible material is gasified during firing to produce voids in the heat bloated material in addition to the voids produced by gasification of said organic or mineral detritus or waste.

8. The process of claim 2 including
   admixing aluminum powder with said mud or soil, and
   adding an alkali to the admixture to form gas bubbles therein,
   whereby said bubbles promote the formation of voids within said mud or soil which are in addition to voids formed through gasification of said organic or mineral detritus during firing.

9. The process of claim 3 including
   admixing aluminum powder with said mud or soil, and
   adding an alkali to the admixture to form gas bubbles therein,
   whereby said bubbles promote the formation of voids within said mud or soil which are in addition to voids formed through gasification of said organic or mineral detritus or waste during firing.

10. The process of claim 5 wherein said alkali is lime.

11. The process of claim 5 wherein said alkali is caustic soda.

* * * * *